US012718172B2

(12) United States Patent
Solari

(10) Patent No.: US 12,718,172 B2
(45) Date of Patent: Aug. 25, 2026

(54) METHODS AND SYSTEMS FOR VALIDATING DATABASE RECORDS BY APPLYING ARTIFICIAL INTELLIGENCE TO PRIORITIZE RECORDS FOR VALIDATION

(71) Applicant: Ensemble RCM, LLC, Cincinnati, OH (US)

(72) Inventor: Soren Solari, Big Sky, MT (US)

(73) Assignee: Ensemble RCM, LLC, Cincinnati, OH (US)

( * ) Notice: Subject to any disclaimer, the term of this patent is extended or adjusted under 35 U.S.C. 154(b) by 79 days.

(21) Appl. No.: 18/802,038

(22) Filed: Aug. 13, 2024

(65) Prior Publication Data

US 2026/0050580 A1 Feb. 19, 2026

Related U.S. Application Data

(63) Continuation of application No. 16/730,076, filed on Dec. 30, 2019, now abandoned.

(51) Int. Cl.

| | |
|---|---|
| ***G06Q 10/0637*** | (2023.01) |
| ***G06F 16/21*** | (2019.01) |
| ***G06F 16/23*** | (2019.01) |
| ***G06N 3/092*** | (2023.01) |
| ***G06N 7/01*** | (2023.01) |
| ***G06N 20/00*** | (2019.01) |

(52) U.S. Cl.
CPC ....... *G06Q 10/06375* (2013.01); *G06F 16/21* (2019.01); *G06F 16/2365* (2019.01); *G06N 3/092* (2023.01); *G06N 7/01* (2023.01); *G06N 20/00* (2019.01)

(58) Field of Classification Search
CPC ................................ G06F 16/21; G06N 3/092
See application file for complete search history.

(56) References Cited

U.S. PATENT DOCUMENTS

2015/0278457 A1* 10/2015 De la Torre ........... G16H 40/20 705/3
2017/0308652 A1* 10/2017 Ligon .................... G06Q 10/10
2020/0143291 A1* 5/2020 Besanson Tuma ...... G06N 5/04
2020/0185069 A1* 6/2020 Jeppson ................. G16H 15/00
2020/0251196 A1* 8/2020 Schneider .............. G16H 15/00
2021/0073920 A1* 3/2021 Wang ....................... G06N 5/04
2022/0198529 A1* 6/2022 Zhang ................ G06Q 30/0271
2023/0084146 A1* 3/2023 Singh ..................... G06Q 10/10 705/4

* cited by examiner

*Primary Examiner* — Khanh B Pham
(74) *Attorney, Agent, or Firm* — Sheridan Ross P.C.

(57) ABSTRACT

Embodiments are directed to methods and systems for validating data in database records. More specifically, embodiments are directed to utilizing artificial intelligence to prioritize records for validation. For example, a reinforcement algorithm can be used to identify records with a high probability of containing erroneous data and prioritize these records for validation.

9 Claims, 5 Drawing Sheets

METHODS AND SYSTEMS FOR VALIDATING DATABASE RECORDS BY APPLYING ARTIFICIAL INTELLIGENCE TO PRIORITIZE RECORDS FOR VALIDATION

FIELD OF THE DISCLOSURE

Embodiments of the present disclosure relate generally to methods and systems for validating data stored in database records and more particularly to applying a reinforcement learning artificial intelligence to prioritize records for validation.

Figure 1:
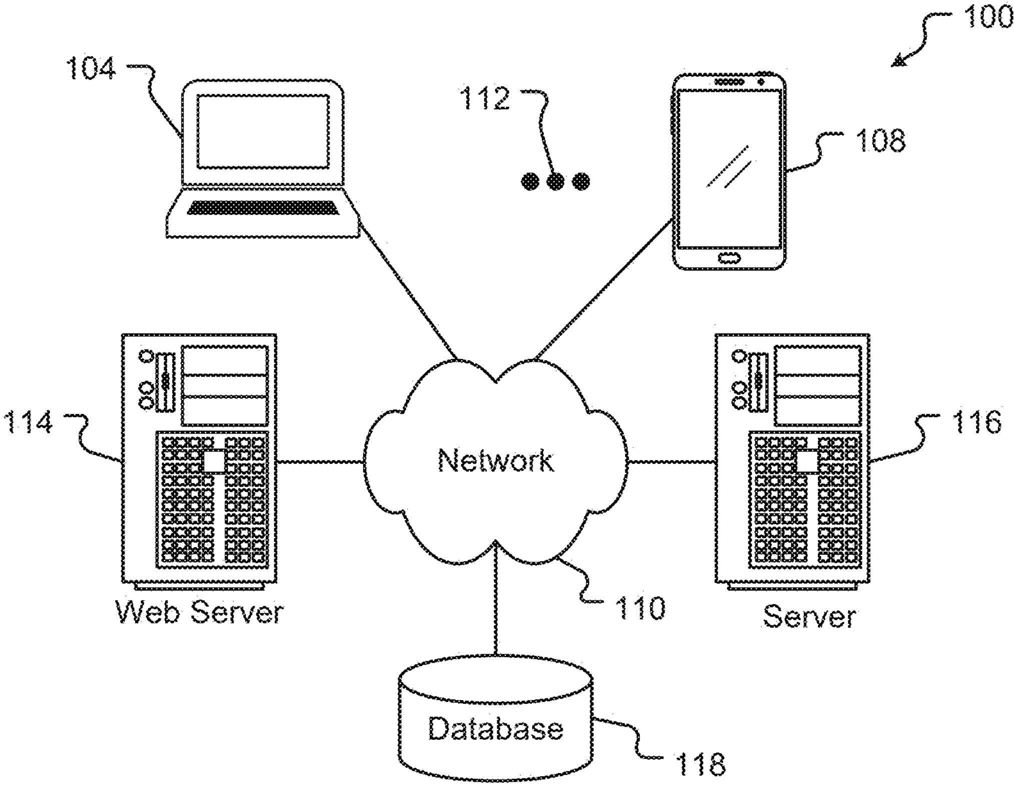
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, AppleTalk, and the like. Merely by way of example, the network 110 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C #®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
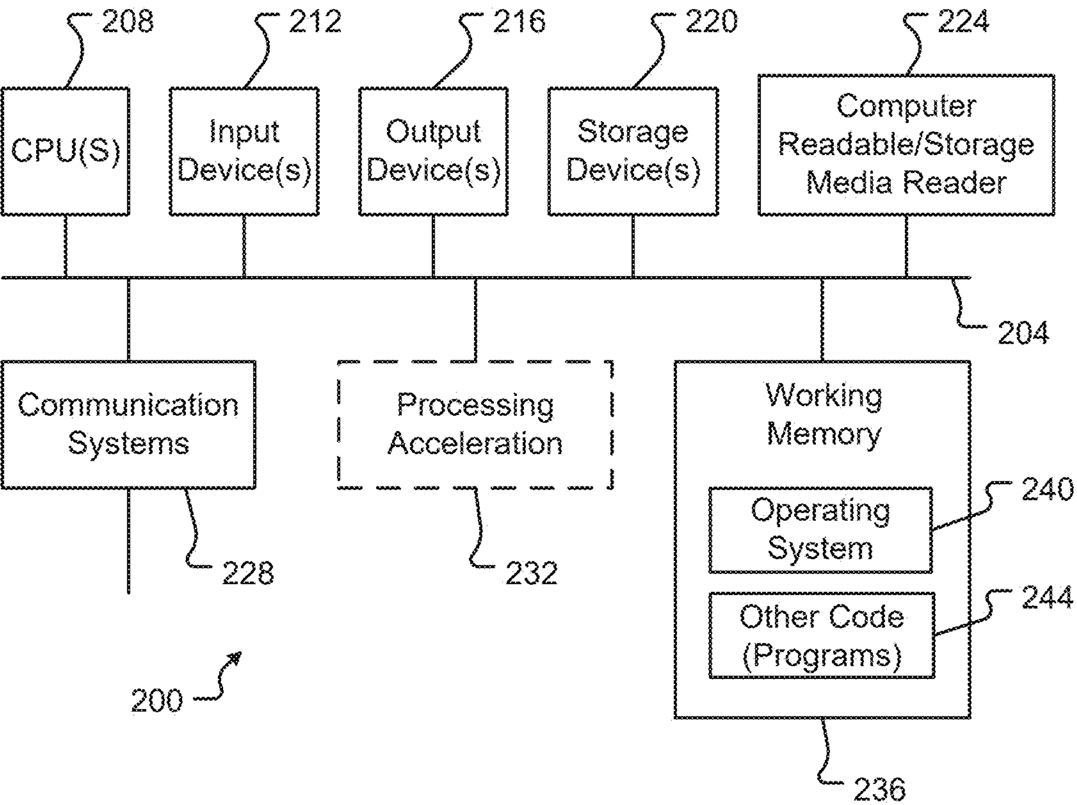
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random-access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
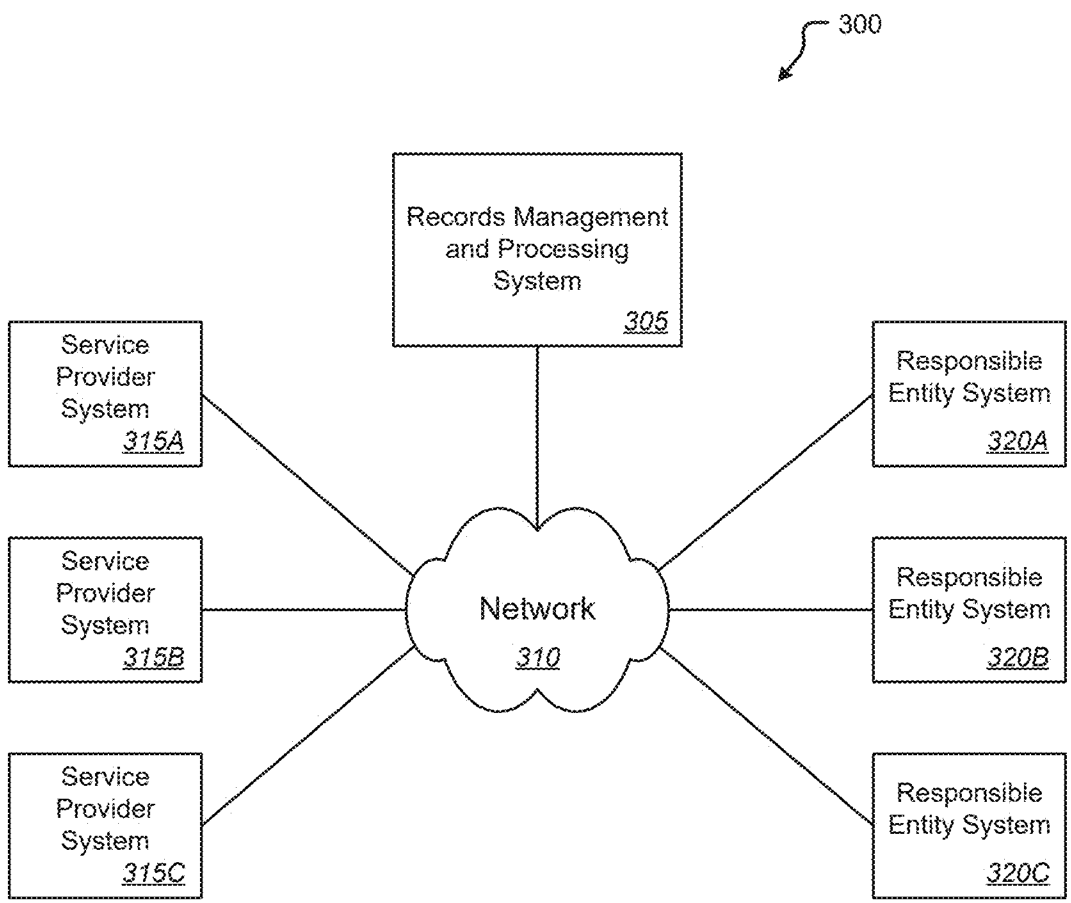
FIG. 3 is a block diagram illustrating an exemplary environment in which a records management and processing system can be implemented according to one embodiment of the present disclosure.

FIG. 3 is a block diagram illustrating an exemplary environment in which a records management and processing system can be implemented according to one embodiment of the present disclosure. As illustrated in this example, the environment 300 can include a number of different systems. Specifically, the environment 300 can include a records management and processing system 305 which can comprise a server or other computing device as described above. The records management and processing system 305 can be communicatively coupled with a communication network 310 such as the Internet or any other one or more wired or wireless, local or wide area networks. The environment 300 can also include a number of service provider systems 315A-315C each of which can comprise a server or other computing device as described above and which can also be communicatively coupled with the communication network 310. Furthermore, the environment 300 can include a number of responsible entity systems 320A-320C each of which can comprise a server or other computing device as described above and which can also be communicatively coupled with the communication network 310. It should be noted that while three service provider systems 315A-315C and three responsible entity systems 320A-320C are shown here for illustrative purposes, any number of such systems 315A-315C and 320A-320C can be present in various different implementations without departing from the scope of the present disclosure.

According to one implementation, the service provider systems 315A-315C can represent those servers or other computer systems typically associated with an entity providing a service consumer. In one embodiment, the providers of the services can comprise healthcare providers such as hospital, doctors, physical therapists, counsellors, out-patient and/or urgent care facilities, pharmacies, or other such providers while the consumer can comprise a patient. In such embodiments, the responsible party systems 320A-320C can comprise, for example, those servers or other computer systems typically associated with an entity responsible for some duties related to the delivery of and/or payment for those services. For example, responsible parties can include third-party payors including but not limited to insurance companies, Medicare, Medicaid, and/or other private, governmental, or mixed public/private entities. While described here with reference to healthcare providers and third-party payors such as insurance companies, it should be understood that various embodiments of the present disclosure are not limited to such implementations. Rather, embodiments of the present invention are believed to be equally adaptable to and useful in environments and systems which process a large volume of electronic records according to complex rules and regulations, business or financial arrangements, etc.

Regardless of the exact implementation of nature of the entities involved, the records management and processing system 305 can comprise an intermediary between a plurality of service providers systems 315A-315C and the plurality of responsible entity systems 320A-320C. As such and as will be described in greater detail below, the records management and processing system 305 can maintain a set of records related to services provided to a consumer by each or the service providers and for which at least one of the responsible entities is responsible in some way, e.g., granting approval, making a payment, providing some additional information, etc. In the normal course of processing such records and such transactions, the records management and processing system 305 may experience a delay in the handling of some records. For example, delays can be caused by data anomalies in records provided to the records management and processing system 305 by the service provider systems 315A-315C. In other cases, delays can be caused by a problem or potential problem with the handling of records or the performance of required actions by the responsible entity systems 320A-320C. In the example of the healthcare implementation described above, the records can represent, at least in part, payments to be made by the responsible entities to the service providers and thus, can represent accounts receivable for the service providers. As such, the timely completion of handling such records can directly impacts the cashflow of the service providers. Additionally, the longer processing of such records is delayed, the more likely the payments will become contested or otherwise become problematic. In other implementations, the timely processing of records by the records management and processing system 305 can be equally important for a variety of other reasons.

Accordingly, embodiments of the present disclosure are directed to methods and systems for the timely processing of records by the records management and processing system 305 exchanged between the service provider systems 315A-315C and the responsible entity systems 320A-320C. More specifically, the records management and processing system 305 can maintain a set of rules defining conditions for processing records and associated actions to affect that processing upon satisfaction of or failure to satisfy the conditions of that rule. The records management and processing system 305 can also maintain tags identifying data in a record, current status of processing of a record, or other information about the record. The records management and processing system 305 can apply the rules to the records and assign tags to the records based on the conditions defined in the applied rules. The records management and processing system 305 can then process the records according to workflows for processing the records based on the assigned tags and applied rules.

In the health care example introduced above and as known in the art, inpatient hospital visits to service providers are largely reimbursed by responsible entities through Diagnostic Related Group (DRG) codes in records as may be processed by the records management and processing system 305. Each DRG code has a weight associated with it that determines the reimbursement value for that visit. DRGs are determined uniquely by a combination of the International Statistical Classification of Diseases and Related Health Problems (ICD), currently ICD-10, diagnoses and procedures that are assigned to a hospital visit as defined by the Centers for Medicare and Medicaid Services (CMS). Changes in any of the diagnoses, procedures, or their ordering, may alter the DRG that is automatically assigned, and as a result, alter the reimbursement for the visit either up or down.

The process of assigning diagnoses and procedures to an inpatient visit involves subjective assignment of ICD-10 codes to records associated with the visit by an experienced coder, e.g., through a service provider system 315A-315C. The coder utilizes their experience to read information, such as doctors notes, on the account and translate that information into a selection of specific ICD-10 codes that accurately describe the visit. Occasionally, there may be multiple valid sets of codes for a visit that produce different DRGs. In this case, it is up to the discretion of the hospital to select the set they feel is most appropriate.

A significant task for a hospital is to optimally code each visit so as to simultaneously accomplish several goals. Generally speaking, these goals can be directed to identifying and addressing anomalies in the coding of the records. For example, one goal can be compliance with CMS and best practices. Another goal may be to minimize incorrect coding which may lead to unnecessary denials or inappropriate approvals. Additionally, or alternatively, a goal may be to obtain an appropriate level reimbursement revenue, i.e., to not overcharge or undercharge for services delivered. Of course, different service providers may consider these goals to have greater or less importance relative to each other.

However, coding errors are a normal byproduct of human subjective discretion. These errors can negatively impact all three of the above stated goals. In order to minimize errors, secondary audits of select accounts can be performed by additional experienced coders to ensure the visit is coded to achieve the hospital's goals. Secondary audits require additional resources and costs. Coding error rates on visits may be low. Re-auditing all visits is therefore impractical. A tradeoff exists between the costs needed to perform secondary audits and the achievement of the hospital's goals.

Embodiments described herein can include methods implemented by the records management and processing system 305 to select records for further processing, such as a secondary audit, based on the goals and relative importance or weight given to the goals by the service provider. Generally speaking, and as will be described in greater detail below, the records management and processing system 305 can be adapted to select records using a reinforcement learning algorithm and based on an expected return value for further processing, e.g., auditing, of the selected one or more records. The expected return value can be based on the weight for each goal and a probability of satisfying each defined goal by further processing of the record. The selected records can then be processed according to one or more workflows which can, for example, initiate and manage an audit process for the selected records.

Figure 4:
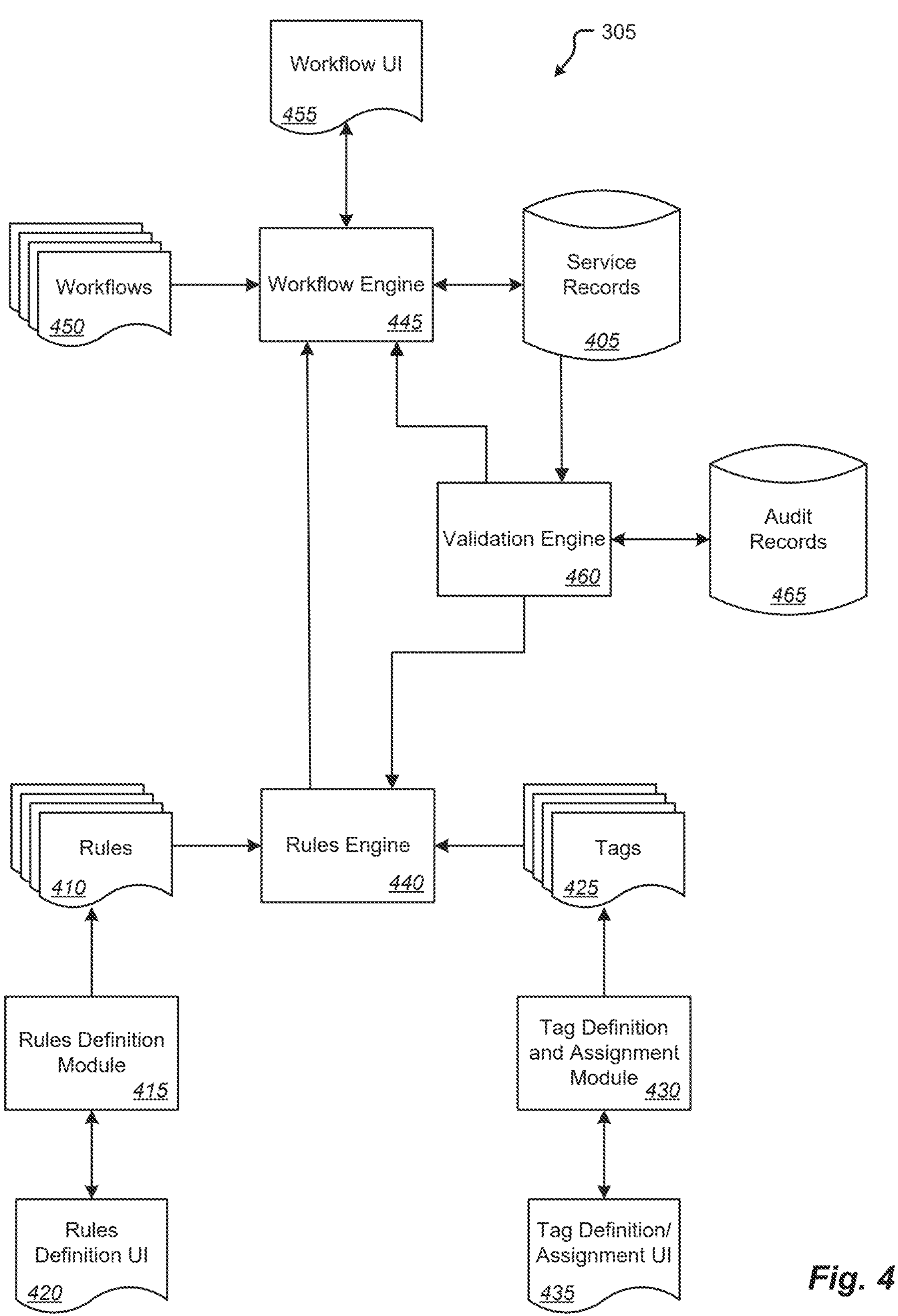
FIG. 4 is a block diagram illustrating elements of an exemplary records management and processing system according to one embodiment of the present disclosure.

FIG. 4 is a block diagram illustrating elements of an exemplary records management and processing system according to one embodiment of the present disclosure. As illustrated in this example, the records management and processing system 305 as described above can comprise a set of records maintained in a database 405 or other repository. As noted above, each record of the set of records in the database can comprise a record of a service provided to a consumer by a service provider and can identify at least one required action by at least one responsible entity of a plurality of responsible entities. Also, as described above, the records management and processing system 305 can comprise an intermediary between systems of the plurality of service providers and systems of the plurality of responsible entities.

The records management and processing system 305 can also maintain one or more rules 410 for managing and processing the records of the database 405. Generally speaking, a rule can comprise a definition of one or more conditions and an associated one or more actions to be performed upon satisfaction, or failure to satisfy, the conditions of that rule. Accordingly, each rule 410 maintained by the records management and processing system 305 can comprise one or more conditions for processing one or more records of the set of records 405 and at least one associated action to affect processing of the one or more records upon satisfaction of or failure to satisfy the one or more conditions of the rule 410. The conditions defined in some of these rules 410 can comprise conditions to be satisfied by one or more of the responsible entities 320A-320C described above. For example, one or more rules can define timing or other conditions a payment by a third-party payor, e.g., Medicare, Medicaid, an insurance company, etc., for a service rendered by the service provider, e.g., a hospital, doctor, pharmacy, etc., to the consumer/patient. Additionally, or alternatively, conditions defined in some of the rules 410 can define parameters for data in the record. For example, rules 410 can be defined for performing checks on the values of various fields of data in the records 405 such as comparing different fields, e.g., a value of total charges relative to a value of total adjustments, etc.

To facilitate definition of the rules 410, the records management and processing system 305 can further comprise a rules definition module 415. Generally speaking, the rules definition module 415 can comprise one or more applications executed by the records management and processing system 305 and which provide a rules definition interface 420. The rules definition interface 420 can include, for example, one or more webpages or other, similar interfaces providing elements through which an authorized user, such as an administrator or manager, can select or otherwise input conditions and corresponding actions for a new or modified rule. Once defined in this manner, the new or modified rule can be saved in the set of rules 410 and made available for application by the records management and processing system 305.

The records management and processing system 305 can also maintain a set of tags 425 for managing and processing the records 405. Generally speaking, these tags 425 can comprise a flag, metadata, or other information used to describe, explain, mark, or otherwise identify records in the set of records 405. For example, the tags 425 can include, but are not limited to, tags used to identify data in a record 405, a current status of processing of the record 405, or other information about the record. As will be described, these tags 425 can be used to identify records 405 that merit additional attention and/or processing and thus, the absence of tags associated with a record can implicitly indicate that additional attention or handling is not needed for that record.

To facilitate definition and use of the tags 425, the records management and processing system 305 can further comprise a tag definition and assignment module 430. Generally speaking, the tag definition and assignment module 430 can comprise one or more applications executed by the records management and processing system 305 and which provide a tag definition and assignment interface 435. The tag definition and assignment interface 435 can include, for example, one or more webpages or other, similar interfaces providing elements through which an authorized user, such as an administrator or manager, can select or otherwise input definitions of new or modified tags. Once defined in this manner, the new or modified tag can be saved in the set of tags 430 and made available for application by the records management and processing system 305.

The records management and processing system 305 can also comprise a rules engine 440. Generally speaking, the rules engine can comprise one or more applications executed by the records management and processing system 305 and which can read and apply the rules 410 to the records 405. That is, the rules engine 440 can compare the records stored in the database 405 to the conditions for the rules 410 and, upon finding records that satisfy, or fail to satisfy as the case may be and depending upon how the condition is defined, can perform or cause to be performed the action associated with the satisfied or failed condition. These actions can include, for example, applying one or more of the tags 425 to the identified records 405 or presenting the identified records to a user and receiving an indication of the tag(s) to be applied. The tag(s) 425 applied to a record can identify or mark that record for further attention to advance the processing of that record. Thus, records that are not tagged do not require additional attention or processing outside of normal processes since they are in a condition as defined in the rules as being normal or acceptable, e.g., within defined deadlines or other time limits etc. In other words, processing can be applied to one set of records based on the tags applied while processing of another set of records can be postponed or delayed so that the first set of records can be given more attention and resources.

The rules engine 440 can apply the rules 410 to the records 405 periodically, on demand, or upon the occurrence of predefined event or the satisfaction of one or more predefined conditions. For example, the rules engine 440 can apply the rules 410 as part of a routine process performed each day, week, month, or other period, and/or may be initiated or kicked off upon request by an authorized user of the system such as a manager or supervisor. As noted above, applying the rules 410 can include tagging one or more records based on the applied rules 410. Additionally, or alternatively, tags can be applied to one or more records based on a user selection or input. For example, a user viewing a set of records can select records from that set and apply one or more tags to those selected records based on conditions the user perceives and which may or may not be defined in the rules. Thus, tagging of records can be driven by the applied rules or based on input from a user and the tags applied in either way can influence the further handling of those tagged records.

According to one embodiment and as illustrated here, the records management and processing system 305 can also comprise a workflow engine 445 and a set of predefined workflows 450. Generally speaking, a workflow 450 can comprise a set of one or more steps to be performed on or related to a record. These steps can be wholly machine executable or may, in some cases, rely on some degree of human intervention. For example, these steps can range from presenting data from a tagged record in a user interface to a human operator, such as a collector, for an action to be performed by the operator, e.g., calling a payor or performing some other follow-up action, to a completely automated process such as sending an automatically generated communication to a payor system or combinations of various such human and machine actions. The workflow engine 445 can comprise one or more applications executed by the records management and processing system 305 and which, during execution, can read the predefined workflows 450 and implement or perform the steps defined therein. The workflows 450 can comprise a set of predefined, executable steps directed to advancing the processing of the records 405 identified by the rules 405 and tagged as described above. The workflow engine 445 can execute the workflows 450 by selecting a workflow 450 based on the tags 425 for a record 405 and executing the selected workflow 450 using the information from that record and, in some cases, based on further application of one or more rules 410 related to the tags 425 applied to that record 405. Thus, the conditions and associated actions defined in the rules 410 can also be applied by the workflow engine 445 as it executes the workflows 450. The workflow engine 445 can also provide a workflow user interface 450 for viewing and managing one or more workflows for processing records.

Therefore, the rules engine 440 can apply one or more of the rules 410 to the records saved in the database 405 to identify those records which should be further processed or given further scrutiny and mark those records with one or more tags 425. In this way, those records found to be within normal or acceptable conditions according to the applied rules need not be subjected to further scrutiny and/or processing thus saving resources such as human effort, processing overhead, etc. In other words, processing of one set of records can be performed in an expedited or priority manner while processing of another set of records can be deprioritized or postponed based on the tags applied to the records which is in turn based on the rules or input from a user.

One or more predefined workflow processes 450 can then be selected, e.g., based on the applied tags, initiated, and executed by the workflow engine 445 to further process those tagged records. The workflows 450 can be initiated automatically, e.g., triggered by the rules engine 445 upon completion of applying the tags 425, upon the occurrence of certain conditions, e.g., as defined in one or more rules 410, at a predetermined or pre-scheduled time, upon request, or in a variety of other ways without departing from the scope of the present disclosure. Processing the tagged records 405 by the workflow engine 445 can comprise performing the steps defined in the workflows 450, which can include applying the selected or additional rules 410 to the records being processed, in order to advance the handling of those records 405 by the records management and processing system 305, e.g., move an account towards payment or other resolution. Additional details of processing the records 405 by the workflow engine 445 based on the applied rules 410 and tags 425 according to various embodiments of the present disclosure will be described below.

As noted above, records 405 processed by the records processing and management system 605 can include Diagnostic Related Group (DRG) codes. Also as noted, these codes are typically assigned by human operators through the service provider systems 315A-315C and, as such, are subject to errors which can cause the records to be non-compliant with standards and/or best practices, to be denied as miscoded, or to inaccurately or incompletely represent diagnosis and treatments resulting in insufficient reimbursement by a responsible entity. Embodiments described herein can include methods implemented by the records management and processing system 305 to select records for further processing, such as a secondary audit of DRG coding in the records.

According to one embodiment and as illustrated here, the records management and processing system 305 can also comprise a validation engine 460. Generally speaking, the validation engine 460 can be adapted to select records 405 using a reinforcement learning algorithm and based on an expected return value for further processing, e.g., auditing, of the selected one or more records. The expected return value can be based on the weight for each of a plurality of goals and a probability of satisfying each goal by further processing of the record. The selected records can then be processed according to one or more workflows 450 as may be executed by the workflow engine 445 and which can, for example, initiate and manage an audit process for the selected records.

In the context of DRG coding, the records 405 may have actual coding anomalies, i.e., errors (i.e. a diagnosis code is incorrect or missing) or suboptimal coding. Suboptimal coding might be an account that has some of the goals achieved such as compliance with CMS and accurate coding as to avoid denial, but due to the coders subjective choice may have resulted in a DRG with an inappropriate level of reimbursement, i.e., too high or too low for the services delivered. For example, this type of coding anomaly can happen as a result of the subjective choice of which diagnoses is the primary diagnoses.

Incorrect or suboptimal inpatient DRG coding may result from a variety of sources. For example, the coder simply made a random error or suboptimal choice such as when notes were present for a given diagnoses but the coder simply overlooked those notes and did not apply a given diagnosis. On a different account with the same note, the coder may apply the correct diagnosis. In another example, the coder cannot reasonably check all the permutations of diagnoses and the resultant DRG. Their choice simply results in a valid DRG that is suboptimal relative to the defined goals. In some cases, the coder has a systematic bias resulting in a certain type of error such as when the coder has incorrectly memorized the number of a code for a given doctors description of the visit, and is consistently incorrectly applying that code. In yet other cases, the coder can make mistakes based on a mix of random error combined with existing knowledge bias. For example, the CMS organization of codes changes year to year. Knowledge of the application of certain codes may have changed and the coder misinterprets notes in some cases and correctly interprets alternate wording of notes in other cases.

A common thread of the errors is that they occur due to human subjective interpretation, which in turn is dependent on the state of the individual at different moments in time. Humans, unlike robots, do not make consistent uniform errors across time. One day the human is very tired and they make some errors and the next day they are well-rested and make fewer errors. Given that errors are a result of humans and those humans work in different service providers, e.g., hospital or hospital groups, errors may not be consistent across service providers. Training may be different from group to group, etc. that create variable distributions of errors across groups. Furthermore, the errors may not be consistent in time. A coder who makes a systematic bias error today, may be educated on their mistake and never make the mistake again. Similarly, a coder may be educated to focus on certain types of accounts today, which leads to less focus on other types of accounts and the new introduction of errors due to their current focus.

However, there are common factors that may make errors more likely. For example, certain DRGs are associated with types of visits that may be more complex and more difficult to code. Other DRGs may have weights that are highly sensitive to diagnoses selections. Certain variables in the data (such as DRG, diagnoses, procedure, length of stay) may represent the probability of an error. However, due to human coding, the distribution of errors on any variable is random and may change over time. Additionally, a training dataset may not be available without a secondary audit, meaning there is a potential lack of knowledge early with increasing knowledge as more audits are done.

According to one embodiment, and with these considerations in mind, a reinforcement learning algorithm, such as the multi-armed bandit algorithm can be executed by the validation engine 460 to select records 405 for auditing and/or other processing. As known in the art, the multi-armed bandit algorithm is utilized to research situations where there are N slot machines, which each have different probabilities of winning and different payouts. The purpose of the algorithm is to optimally select a slot to play at each time iteration. The outcome of that single slot pull gives the algorithm incomplete information on the future expected value of pulling that slot machine again. The algorithm uses the current information to select the next slot to pull in order to maximize the total returned value across all slot-machines over some time frame.

The DRG validation problem can be framed in a multi-armed bandit sense wherein each DRG is considered to represent a slot machine, an audit of a specific DRG is considered to be the equivalent of pulling the slot machine, and the outcome of the audit determines an ongoing expected value of selecting that DRG to audit again. However, according to embodiments of the present invention, the algorithm is modified to select multiple accounts (DRGs) to audit simultaneously and get feedback from these audits through time. Additionally, the algorithm according to embodiments described herein is adapted to handle changes to the probability distribution of any DRG over time and across service providers (hospital groups).

As noted above, goals for the audits are directed to identifying anomalies in the coding of the records and can include, but are not limited to, compliance with CMS and best practices, identifying incorrect coding that can lead to unnecessary denials or inappropriate approvals, and/or obtaining an appropriate level of reimbursement revenue, to not overcharge or undercharge for the services rendered. The total expected return value used by the validation engine 460 can be defined as the net sum of the value of each goal: Total_expected_return_value=expected_value_goal_1+expected_value_goal_2+expected_value_goal_3

It should not be assumed that value is exclusively determined by the revenue returned. If the algorithm exclusively optimizes toward this goal then the other goals may not be achieved at all. Accordingly, value should be defined comparatively across all goals. The validation engine 460 can then select records 405 that will return a global optimization across the goals. The weighting of each goal can be used to determine the focus of the algorithm.

A distinction should be made between the expected return value and the return value. The expected return value of auditing a record depends on both the probability of a successful audit combined with the return value of that audit. As an example, take a case of two different DRGs (DRG_A and DRG_B). First considering the appropriate reimbursement goal, assume DRG_A has a resultant weight change 20% of the time on average, whereas DRG_B has a resultant weight change 50% of the time on average. Further assuming the average weight change for DRG_A is 1.0, whereas the average weight change for DRG_B is 0.1, the expected value of each are computed as follows:

Expected_weight_change_value=probability_of_change*average_weight_change

So:

Expected_value_DRG_A=0.2*1.0=0.2

Expected_value_DRG_B=0.5*0.1=0.05

Although DRG_B is more than twice as likely to result in a DRG change, the fact that DRG_A results in such a high weight change means that it should actually be selected to be audited instead of DRG_B.

Next, consider the compliance goal. Compliance could be viewed as a fixed cost across all records and service providers. For example, the value of converting a non-compliant account to a compliant account can be defined as equivalent to a weight change of compliance_value=0.25. This value can be added to each DRG as the expected value of a compliance modification:

Expected_compliance_value=probability_of_change*compliance_value

So

Expected_value_DRG_A=0.2*0.25=0.05

Expected_value_DRG_B=0.5*0.25=0.125

Therefore, to maximize the compliance goal, DRG_B should be selected. A total expected value can be created by combining the two:

Expected_weight_compliance_DRG_A=0.2*1.0+0.2*0.25=0.25

Expected_weight_compliance_DRG_B=0.5*0.1+0.5+0.25=0.175

As can be seen, the total expected value of selecting each DRG is now more balanced and is a combination of appropriate reimbursement revenue and maintaining compliance.

The prevention of denials or inappropriate approvals is likely a fixed cost as well. Therefore, rather than determining the value of a downgraded DRG to be the resultant weight change, a fixed weight can be applied to all downgrades similar to compliance. In this sense the value of compliance and denials/approvals can be combined into a single uniform weight. Combining the results determined above, the 'exploitation' expected return value for a DRG is as follows for the three goals:

Expected_return_value_drg_x=
probability_of_drg_change*average_weight_change+(goal_3)
probability_of_drg_change*fixed_downgrade_weight_cost+(goal_2)
probability_of_account_comments*fixed_compliance_weight_cost (goal_1)

The last line for goal_1 means that some value can be introduced to those records that may receive lots of auditor comments and, as a consequence, may result in further education but do not change the record. In this way the validation engine 460 can attempt to find records that simultaneously achieve all the goals.

The expected value return relies on the probability of an event such as a DRG change or auditor comment on a record. The algorithm should work even in the case where no information is available about the probability of any event happening. Here, the validation engine 460 can begin auditing different records in order to compute their probabilities of events. Since the validation engine 460 should gather audit records 465 and other information in order to have accurate probabilities, which as a result leads to the optimization of the goals, an expected value can be assigned to the gathering of information and that expected value can be added to the original expected value equations.

The more times a DRG has been sampled, the more accurate is the probability estimate. Therefore, the information value can be inversely proportional to the number of times the DRG has been sampled. This can be considered the 'confidence' on the DRG. Multiple accounts can be sampled simultaneously and as accounts are sampled together, the number of times this DRG is sampled accumulates. This implicitly increases future confidence, which can be taken into account when computing the value of information on every new visit to be sampled. The confidence in a DRG might also be used to modify the expected return value. In this way oversampling a DRG that has only 1 data point with a huge weight change can be avoided.

In general, and as described above, DRG validation errors likely occur at the individual coder level. Any systematic biases will only be discovered through the sampling and learning of information at the service provider, e.g., hospital level. However, when a new service provider will be audited, there may not be audit records 465 any DRGs at that service provider. Rather than start completely from scratch it is possible to utilize audit information 465 from previous audits of other service providers. Furthermore, the reliance on any existing audit records 465 can be dynamically modified as the knowledge of the target service provider grows.

The combined score utilizing pre-existing information can be viewed as a weighted average of two different DRG validation processes with one being based on preexisting information and one that is service provider specific. The weights can be dependent on a global confidence of information at the new service provider: Final_score=(1−ConfidenceWeight)*DRG validation process (pre-existing_info)+ConfidenceWeight*DRG validation process (service provider)

On the first day, the confidenceWeight for the new provider may be 0, meaning that all selections of DRG information will rely on pre-existing audit information. However, as the confidence of information for the service provider grows, then the validation engine 460 can rely more and more on the service provider specific audit results. The confidenceWeight can also be a relative ratio of the confidence of the preexisting information to the confidence at the service provider.

Stated another way, validating data assigned to one or more fields in each of a plurality of database records, such as DRGs, for example, can comprise maintaining, by the records management and processing system 305, a plurality of records 405 in a database. Each record of the plurality of records 405 can comprise a record of a service provided to a consumer by a service provider of a plurality of service providers. The one or more fields of each record can comprise a code, such as a DRG code, related to the service.

The validation engine 460 of the records management and processing system 305 can define and maintain a plurality of goals for the validating of the data assigned to the one or more fields. Each goal can be directed to identifying anomalies in the records and can be related to a different possible result of the validating of the data assigned to the one or more fields. For example, the goals can comprise a goal directed to compliance with a set of predefined requirements for the one or more fields in each record, a goal directed to denials of records by the plurality of responsible entities based on a value for the one or more fields in a record, i.e., minimizing denials inappropriate denials or approvals based on the coding, and/or a goal directed to an appropriate level of reimbursement revenue from the plurality of responsible entities for the plurality of records, i.e., not overcharging or undercharging for the services delivered. The validation engine 460 of the records management and processing system 305 can define and maintain a weight for each goal of the plurality of goals for the validating of the data assigned to the one or more fields.

The validation engine 460 of the records management and processing system 305 can then select one or more records of the plurality of records 405 using a reinforcement learning algorithm, e.g., a multi-arm bandit algorithm, and based on an expected return value for further processing of the selected one or more records. As described, the expected return value can be based on the weight for each goal of the plurality of goals for the validating of the data assigned to the one or more fields and a probability of satisfying each defined goal by further processing of the record. The expected return value for a record can comprise a sum of the probabilities of satisfying each defined goal by further processing of the record weighted by the defined weight for the defined goal and selecting the one or more one or more records of the plurality of records based on the expected return value for further processing of the selected one or more records comprises maximizing a total expected value for further processing of the selected records based on the plurality of goals.

In the process of selecting records 405, the validation engine 460 can also determine a value for gathering additional information about the records 405 and the expected return value can be further based on the determined value for gathering additional information. This determined value for gathering additional information by further processing of a record, e.g., auditing the record, can be inversely proportional to a number of times records with a same type or from a same source have been previously processed and as indicated in a set of audit records 465 comprising results of previous audits. A final score for the selected records can comprise a sum of the expected value for the selected first set of one or more records weighted by a confidence factor determined based on the audit records 465.

Once the records have been selected by the validation engine 460, the selected records can be further processed according to one or more workflows 450 executed the workflow engine 445 by the records management and processing system 305 as described above. According to one embodiment, processing the selected one or more records according to one or more workflows 450 can comprise initiating an audit of each of the selected one or more records, e.g., through the workflow UI 455 or the service provider system 315A-315C for which the record is being processed. Initiating the audit of each of the selected records can comprise, for example, selecting an agent to conduct the audit, e.g., based on current workload, area of expertise, paste experience with the same source or service provider, etc. Additionally, or alternatively, initiating the audit can comprise prioritizing the selected one or more records in a work queue of an agent, e.g., based on current workload, the type of record, the source of the record, etc. Once the audit has been conducted, the workflow 450 can further update the audit records 465 and/or update the weight for one or more goals of the plurality of goals based on results of performing the audit.

Figure 5:
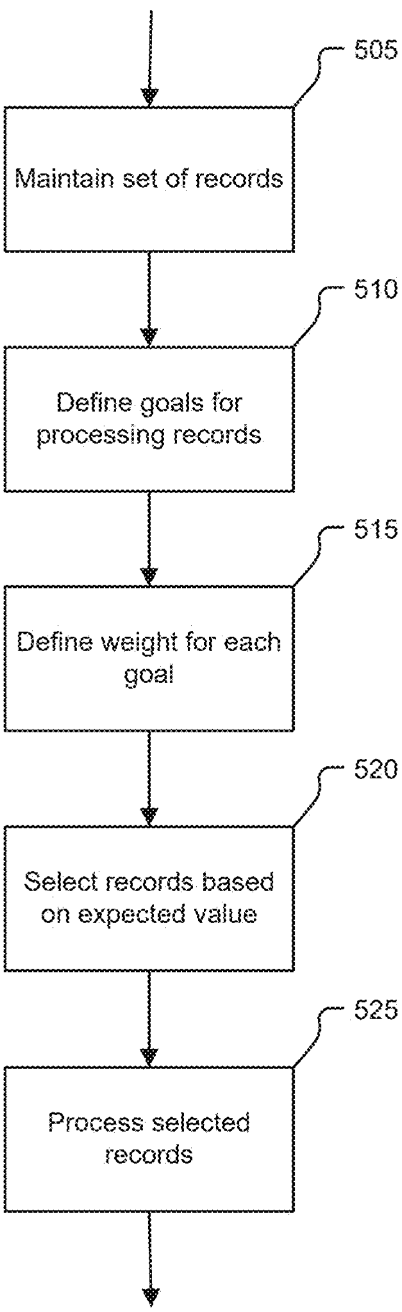
FIG. 5 is a flowchart illustrating an exemplary process for validating data assigned to one or more fields in each of a plurality of database records according to one embodiment of the present disclosure.

FIG. 5 is a flowchart illustrating an exemplary process for validating data assigned to one or more fields in each of a plurality of database records according to one embodiment of the present disclosure. As illustrated in this example, validating data assigned to one or more fields in each of a plurality of database records can comprise maintaining 505, as described above, a plurality of records in a database. Each record of the plurality of records can comprise a record of a service provided to a consumer by a service provider of a plurality of service providers. The one or more fields of each record can comprise a code related to the service. For example, the code can comprise a DRG code.

A plurality of goals can be defined 510 for the validating of the data assigned to the one or more fields. Each goal can be directed to identifying anomalies in the coding of the records and can be related to a different possible result of the validating of the data assigned to the one or more fields. For example, the goals can include, but are not limited to, a goal directed to identifying anomalies related to compliance with a set of predefined requirements for the one or more fields in each record, a goal directed to denials of records by the plurality of responsible entities based on an incorrect value for the one or more fields in a record, and/or a goal directed to a level of reimbursement revenue, high or low, from the plurality of responsible entities for the plurality of records. A weight can also be defined 515 for each goal of the plurality of goals for the validating of the data assigned to the one or more fields.

One or more records of the plurality of records can be selected 520 for further processing. The records can be selected 520 using a reinforcement learning algorithm and based on an expected return value of the selected one or more records. According to one embodiment, the reinforcement learning algorithm can comprise a multi-arm bandit algorithm. The expected return value can be based on the weight for each goal of the plurality of goals for the validating of the data assigned to the one or more fields and a probability of satisfying each defined goal by further processing of the record. The expected return value for a record can comprise a sum of the probabilities of satisfying each defined goal by further processing of the record weighted by the defined weight for the defined goal.

Selecting 520 the one or more one or more records of the plurality of records based on the expected return value for further processing of the selected one or more records can comprise maximizing a total expected value for further processing of the selected records based on the plurality of goals. In addition to exploiting available information in this way, embodiments can also include exploring available information for additional insights. Therefore, according to one embodiment, a value for gathering additional information by further processing of a record can be determined and the expected return value can be further based on the determined value for gathering additional information by further processing of a record. The determined value for gathering additional information by further processing of a record can be inversely proportional to a number of times records with a same type have been previously processed.

As noted above, the records can be selected 520 from more than one source, e.g., different service provider systems as described. In such cases, selecting the one or more records of the plurality of records using the reinforcement learning algorithm and based on the expected return value for further processing of the selected one or more records can comprise selecting a first set of one or more records from a first service provider and selecting a second set of one or more records from a second service provider using the reinforcement learning algorithm and based on an expected return value for further processing of the selected second set of one or more records. A final score can be determined for the selected first set of one or more records and the selected second set of one or more records together. The final score can comprise a sum of the expected value for the selected first set of one or more records weighted by a confidence factor for the first service provider and the expected value for the selected second set of one or more records weighted by a confidence factor for the second service provider.

The selected one or more records can then be processed 525 according to one or more workflows as described above. Processing 525 the selected one or more records according to one or more workflows can comprise initiating an audit of each of the selected one or more records. Initiating the audit of each of the selected one or more records can include, but is not limited to, selecting an agent to conduct the audit, prioritizing the selected one or more records in a work queue of an agent, updating a set of audit records based on results of performing the audit, and/or updating the weight for one or more goals of the plurality of goals based on results of performing the audit.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for validating data assigned to one or more fields in each of a plurality of database records, the method comprising:

maintaining, by a records management and processing system, a plurality of records in a database, wherein each field of the one or more fields of each record comprises one of a plurality of predefined codes;

defining, by the records management and processing system, a plurality of goals for the validating of the data assigned to the one or more fields, each goal related to a different possible result of the validating of the data assigned to the one or more fields;

defining, by the records management and processing system, a weight for each goal of the plurality of goals for the validating of the data assigned to the one or more fields;

selecting, by the records management and processing system, a first set of one or more records of the plurality of records using a reinforcement learning algorithm and based on an expected value for further processing of the selected one or more records, wherein the expected value is based on the weight for each goal of the plurality of goals for the validating of the data assigned to the one or more fields and a probability of satisfying each defined goal by further processing of the record, wherein the reinforcement learning algorithm comprises a multi-arm bandit algorithm, wherein selecting the one or more records of the plurality of records based on the expected value for further processing of the selected one or more records comprises maximizing a total expected value for further processing of the selected records based on the plurality of goals, wherein the expected value for a record comprises a sum of the probabilities of satisfying each defined goal by further processing of the record weighted by the defined weight for the defined goal;

selecting, by the records management and processing system, a second set of one or more records using the reinforcement learning algorithm and based on an expected value for further processing of the selected second set of one or more records; and determining, by the records management and processing system, a final score for the selected first set of one or more records and the selected second set of one or more records together, wherein the final score comprises a sum of the expected value for the selected first set of one or more records weighted by a confidence factor for the first service provider and the expected value for the selected second set of one or more records weighted by a confidence factor for the second service provider; and processing, by the records management and processing system, the selected first set of one or more records and the selected second set of one or more records based on the total score and according to one or more workflows executed by the records management and processing system.

2. The method of claim 1, wherein the goals comprise two or more of a goal directed to compliance with a set of predefined requirements for the one or more fields in each record, a goal directed to denials of records by the plurality of responsible entities based on an incorrect value for the one or more fields in a record, and a goal directed to a level of reimbursement.

3. The method of claim 1, further comprising determining, by the records management and processing system, a value for gathering additional information by further processing of a record, wherein the expected value is further based on the determined value for gathering additional information by further processing of a record and wherein the determined value for gathering additional information by further processing of a record is inversely proportional to a number of times records with a same type have been previously processed.

4. A system comprising:

a processor; and a memory coupled with and readable by the processor and storing therein a set of instructions which, when executed by the processor, causes the processor to validate data assigned to one or more fields in each of a plurality of database records by:

maintaining a plurality of records in a database, wherein each field of the one or more fields of each record comprises one of a plurality of predefined codes;

defining a plurality of goals for the validating of the data assigned to the one or more fields, each goal related to a different possible result of the validating of the data assigned to the one or more fields;

defining a weight for each goal of the plurality of goals for the validating of the data assigned to the one or more fields;

selecting a first set of one or more records of the plurality of records using a reinforcement learning algorithm and based on an expected value for further processing of the selected one or more records, wherein the expected value is based on the weight for each goal of the plurality of goals for the validating of the data assigned to the one or more fields and a probability of satisfying each defined goal by further processing of the record, wherein the reinforcement learning algorithm comprises a multi-arm bandit algorithm, wherein selecting the one or more records of the plurality of records based on the expected value for further processing of the selected one or more records comprises maximizing a total expected value for further processing of the selected records based on the plurality of goals, wherein the expected value for a record comprises a sum of the probabilities of satisfying each defined goal by further processing of the record weighted by the defined weight for the defined goal;

selecting a second set of one or more records using the reinforcement learning algorithm and based on an expected value for further processing of the selected second set of one or more records; and determining a final score for the selected first set of one or more records and the selected second set of one or more records together, wherein the final score comprises a sum of the expected value for the selected first set of one or more records weighted by a confidence factor for the first service provider and the expected value for the selected second set of one or more records weighted by a confidence factor for the second service provider; and processing the selected first set of one or more records and the selected second set of one or more records based on the total score and according to one or more workflows executed by the records management and processing system.

5. The system of claim 4, wherein the goals comprise two or more of a goal directed to compliance with a set of predefined requirements for the one or more fields in each record, a goal directed to denials of records by the plurality of responsible entities based on an incorrect value for the one or more fields in a record, and a goal directed to a level of reimbursement.

6. The system of claim 4, further comprising determining a value for gathering additional information by further processing of a record, wherein the expected value is further based on the determined value for gathering additional information by further processing of a record and wherein the determined value for gathering additional information by further processing of a record is inversely proportional to a number of times records with a same type have been previously processed.

7. A non-transitory, computer-readable medium comprising a set of instructions stored therein which, when executed by a processor, causes the processor to validate data assigned to one or more fields in each of a plurality of database records by:

maintaining a plurality of records in a database, wherein each field of the one or more fields of each record comprises one of a plurality of predefined codes;

defining a plurality of goals for the validating of the data assigned to the one or more fields, each goal related to a different possible result of the validating of the data assigned to the one or more fields;

defining a weight for each goal of the plurality of goals for the validating of the data assigned to the one or more fields;

selecting a first set of one or more records of the plurality of records using a reinforcement learning algorithm and based on an expected value for further processing of the selected one or more records, wherein the expected value is based on the weight for each goal of the plurality of goals for the validating of the data assigned to the one or more fields and a probability of satisfying each defined goal by further processing of the record, wherein the reinforcement learning algorithm comprises a multi-arm bandit algorithm, wherein selecting the one or more records of the plurality of records based on the expected value for further processing of the selected one or more records comprises maximizing a total expected value for further processing of the selected records based on the plurality of goals, wherein the expected value for a record comprises a sum of the probabilities of satisfying each defined goal by further processing of the record weighted by the defined weight for the defined goal;

selecting a second set of one or more records using the reinforcement learning algorithm and based on an expected value for further processing of the selected second set of one or more records; and determining a final score for the selected first set of one or more records and the selected second set of one or more records together, wherein the final score comprises a sum of the expected value for the selected first set of one or more records weighted by a confidence factor for the first service provider and the expected value for the selected second set of one or more records weighted by a confidence factor for the second service provider; and processing the selected first set of one or more records and the selected second set of one or more records based on the total score and according to one or more workflows executed by the records management and processing system.

8. The non-transitory, computer-readable medium of claim 7, wherein the goals comprise two or more of a goal directed to compliance with a set of predefined requirements for the one or more fields in each record, a goal directed to denials of records by the plurality of responsible entities based on an incorrect value for the one or more fields in a record, and a goal directed to a level of reimbursement.

9. The non-transitory, computer-readable medium of claim 7, further comprising determining a value for gathering additional information by further processing of a record, wherein the expected value is further based on the determined value for gathering additional information by further processing of a record and wherein the determined value for gathering additional information by further processing of a record is inversely proportional to a number of times records with a same type have been previously processed.

* * * * *